US006931708B1

(12) United States Patent
Elwell

(10) Patent No.: US 6,931,708 B1
(45) Date of Patent: Aug. 23, 2005

(54) INTERIOR AND EXTERIOR GRILLE INSERTS AND METHOD FOR MAKING SAME

(75) Inventor: James P. Elwell, Ankeny, IA (US)

(73) Assignee: Putco, Inc., Story City, IA (US)

( * ) Notice: Subject to any disclaimer, the term of this patent is extended or adjusted under 35 U.S.C. 154(b) by 117 days.

(21) Appl. No.: 10/613,640

(22) Filed: Jul. 2, 2003

(51) Int. Cl.[7] .......................... B23P 11/00; B23P 15/12
(52) U.S. Cl. .................... 29/428; 29/897.15; 29/557; 29/558; 40/591; 40/643; 428/31; 428/542.2
(58) Field of Search .................. 29/428, 557, 558, 29/897.15; 428/7, 31, 542.2; 40/591, 618, 40/643, 644; 180/68.6; 293/115

(56) References Cited

U.S. PATENT DOCUMENTS

| | | | | | |
|---|---|---|---|---|---|
| D155,321 | S | * | 9/1949 | Phillips | D12/171 |
| 4,172,331 | A | * | 10/1979 | Becker | 40/591 |
| 4,883,139 | A | * | 11/1989 | Gross | 180/68.6 |
| RE34,907 | E | * | 4/1995 | Gross | 180/68.6 |
| D420,961 | S | * | 2/2000 | Sousamian | D12/163 |
| 6,206,438 | B1 | * | 3/2001 | Pueyo | 293/115 |
| D456,322 | S | * | 4/2002 | Horowitz | D12/163 |
| 6,677,065 | B2 | * | 1/2004 | Blauer | 40/1.5 |
| D488,111 | S | * | 4/2004 | Elwell | D12/163 |
| 6,729,055 | B2 | * | 5/2004 | Chou | 40/546 |
| 6,761,385 | B2 | * | 7/2004 | Taljaard | 293/115 |
| 6,854,545 | B1 | * | 2/2005 | Elwell et al. | 180/68.6 |
| 2002/0058113 | A1 | * | 5/2002 | Dimone | 428/31 |
| 2003/0082318 | A1 | * | 5/2003 | Jacobs | 428/31 |
| 2004/0007408 | A1 | * | 1/2004 | Seffernick et al. | 180/68.6 |
| 2004/0055197 | A1 | * | 3/2004 | House | 40/618 |

* cited by examiner

Primary Examiner—Essama Omgba
(74) Attorney, Agent, or Firm—McKee, Voorhees & Sease, P.L.C.

(57) ABSTRACT

An exterior grille insert includes a central opening. An interior grille insert conforms to the shape of the interior opening of the exterior grille. The cutting of the interior opening of the exterior grille forms the interior grille. Either the interior grille or the exterior grille can be attached to and superimposed over the front of a vehicle grille for decorative purposes.

9 Claims, 3 Drawing Sheets

INTERIOR AND EXTERIOR GRILLE INSERTS AND METHOD FOR MAKING SAME

BACKGROUND OF THE INVENTION

The present invention relates to an interior and an exterior grille insert and method for making same.

Recently decorative inserts have become popular for mounting on the front of the permanent vehicle grille. These grille inserts take a variety of shapes and forms, but as a general rule they are shaped to fit the perimeter of permanent vehicle grille.

In the manufacture of these grille inserts, there is a considerable amount of scrap. This is because the grille insert is cut to the particular decorative shape desired, and the scrap material is discarded.

Therefore a primary object of the present invention is the provision of an improved interior and exterior grille insert and the method for making same.

A further object of the present invention is the provision of a method for making interior and exterior grille inserts which minimizes the scrap material resulting from the shaping of the grille insert.

A further object of the present invention is the provision of an improved interior and exterior grille insert which are complimentary to one another so that the interior grille insert assumes the shape of the central opening in the exterior grille insert.

A further object of the present invention is the provision of a grille insert which is decorative in appearance, efficient in operation, and durable in use.

BRIEF SUMMARY OF THE INVENTION

The foregoing objects may be achieved by an ornamental device for a vehicle having a vehicle grille, the vehicle grille having a vehicle grille perimeter extending there around. The ornamental device comprises a first grille insert having a size substantially smaller than the size of the vehicle grille and having a first grille perimeter sized to fit completely within and be spaced inwardly from the vehicle grille perimeter along the entire length of the first grille perimeter. A bracket attaches the first grille insert to the vehicle grille.

The method of the present invention involves making first and second grille inserts for attachment over the first and second vehicle grilles of first and second vehicles respectively. The first and second vehicle grilles each have first and second vehicle grille perimeter edges respectively. The method includes taking a blank sheet of metal having a first perimeter edge extending there around. An opening is cut in the blank of sheet material, the opening following a predetermined pattern so as to form a first grille insert having a first perimeter edge and having an opening therein that is shaped in the predetermined pattern. The opening also forms a second grille insert having a second perimeter edge shaped and sized in the predetermined pattern. The first grille insert is attached to the first vehicle grille and the second grille insert is attached to the second vehicle grille. The second grille insert is smaller than the second vehicle grille.

According to another feature of the above method the first perimeter edge of the first grille insert is approximately the same size and shape of the first vehicle grille and the method comprises registering the first grille insert with the first vehicle grille before attaching it in place.

According to another feature of the above method, the second grille insert is attached to the second vehicle grille in a position over the second vehicle grille so that the perimeter edge of the second grille insert is spaced inwardly from the second vehicle grille perimeter.

DETAILED DESCRIPTION OF THE PREFERRED EMBODIMENT

Figure 1:
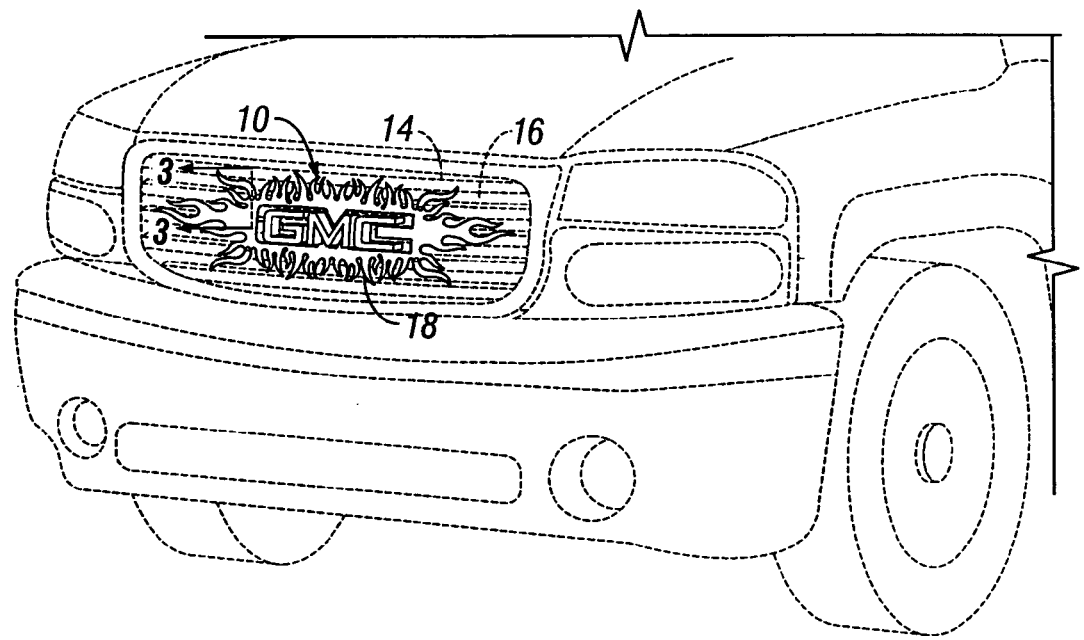
FIG. 1 is a perspective view of the interior grille insert mounted over the front of a vehicle grille.

Referring to the drawings the numeral 10 generally designates the interior grille insert of the present invention and the numeral 12 generally represents the exterior grille insert of the present invention. Both grille inserts 10 and 12 are mounted in superimposed relationship over the vehicle grille opening 14 of a vehicle grille 16. The interior grille insert 10 includes an outer perimeter 18 which maybe cut in a variety of decorative shapes to achieve the desired effect. Also a central opening 20 maybe provided in the interior grille insert 10 to show the vehicle identification emblem which appears often in the center of the vehicle grille 16.

Exterior grille insert 12 includes an outer perimeter 22 which coincides with the outer perimeter of the vehicle grille opening 14. Exterior grille insert 12 includes a central opening 24 having a perimeter 26 which coincides exactly in size and shape with the outer perimeter 18 of interior grille insert 10.

Figure 2:
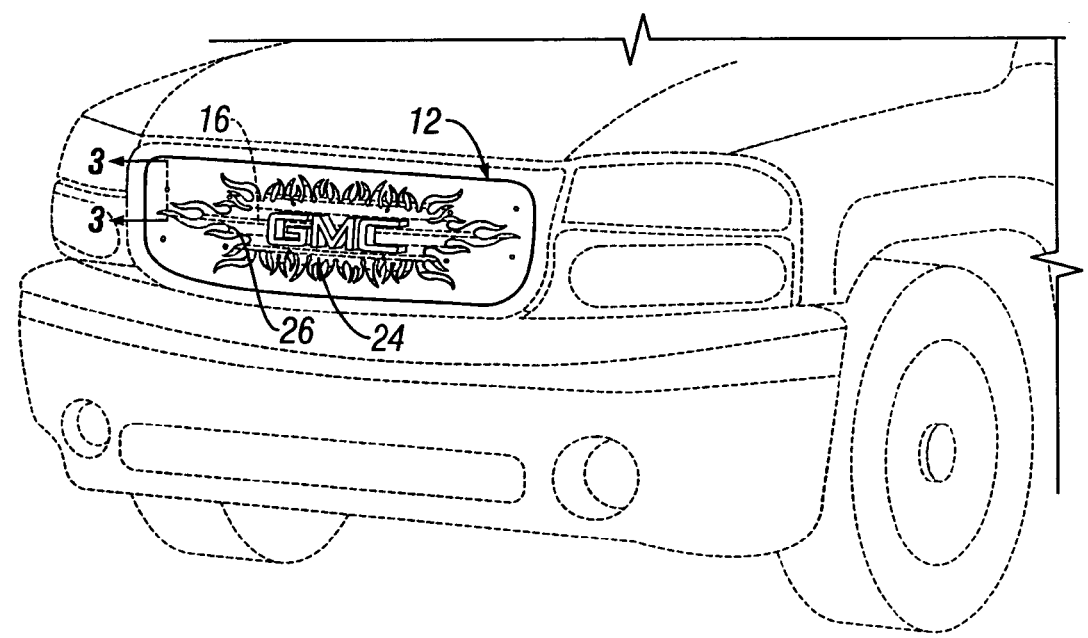
FIG. 2 is a view similar to FIG. 1, but showing the exterior grille insert mounted over the vehicle grille.

As can be seen in FIG. 1, the vehicle grille 16 appears outside the perimeter 18 of the interior grille insert 10. In other words perimeter 18 of the interior grille insert 10 is spaced inwardly from the vehicle grille opening 14. In contrast, in FIG. 2, the vehicle grille 16 is visible through the central opening 24 and the exterior of vehicle grille 16 is blocked from view by the exterior grille insert 12.

Figure 3:
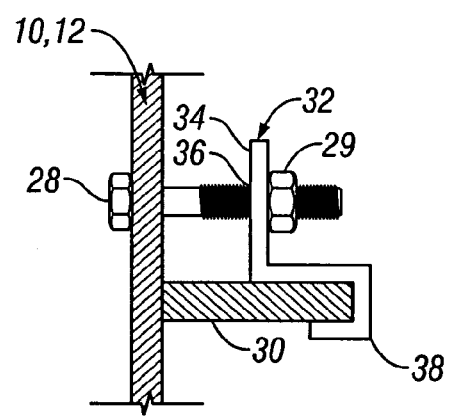
FIG. 3 is a sectional view taken along lines 3—3 of FIGS. 1 and 3—3 of FIG. 2.

FIG. 3 illustrates the manner in which the grille inserts 10, 12 are attached to the vehicle grille 16. The vehicle grille 16 includes a plurality of cross members 30. A screw or bolt 28 extends through the grille inserts 10 or 12 and includes a nut 29 on its inner end. A bracket 32 includes a vertical leg 34 having a bolt hole 36 therein through which the bolt 28 extends. The bracket 32 also includes a unshaped portion 38 which fits around and mates with the cross member 30. By tightening the nut 29 it is possible to attach the interior grille 10 or the exterior grille 12 to the front of the vehicle grille 16.

Figure 5:
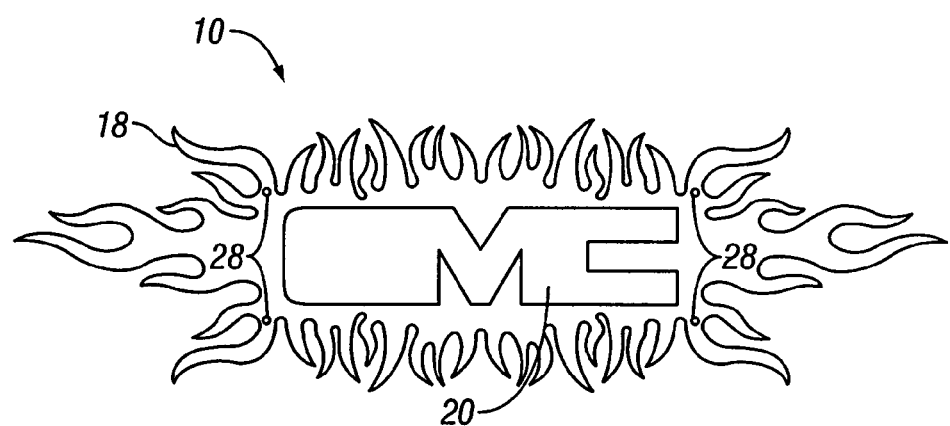
FIG. 5 is a top plan view of the interior vehicle grille.
Figure 6:
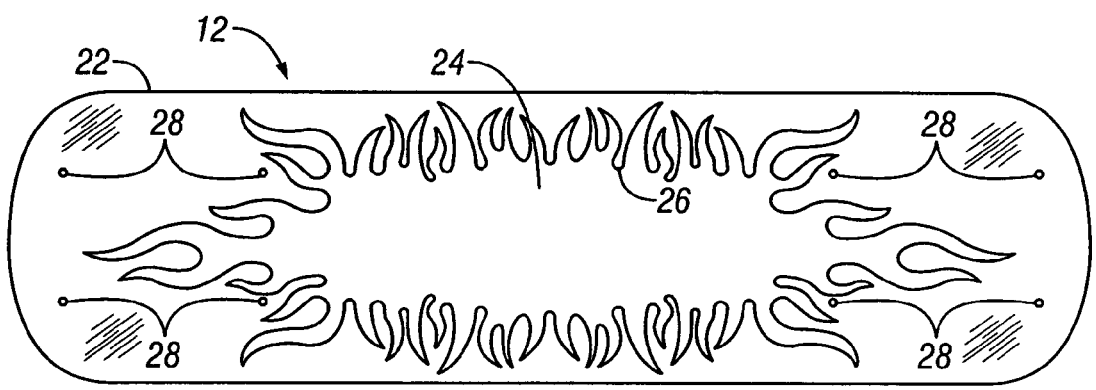
FIG. 6 is a top plan view of the exterior vehicle grille.

Referring to FIGS. 5 and 6, the various bolts 28 are shown.

Figure 4:
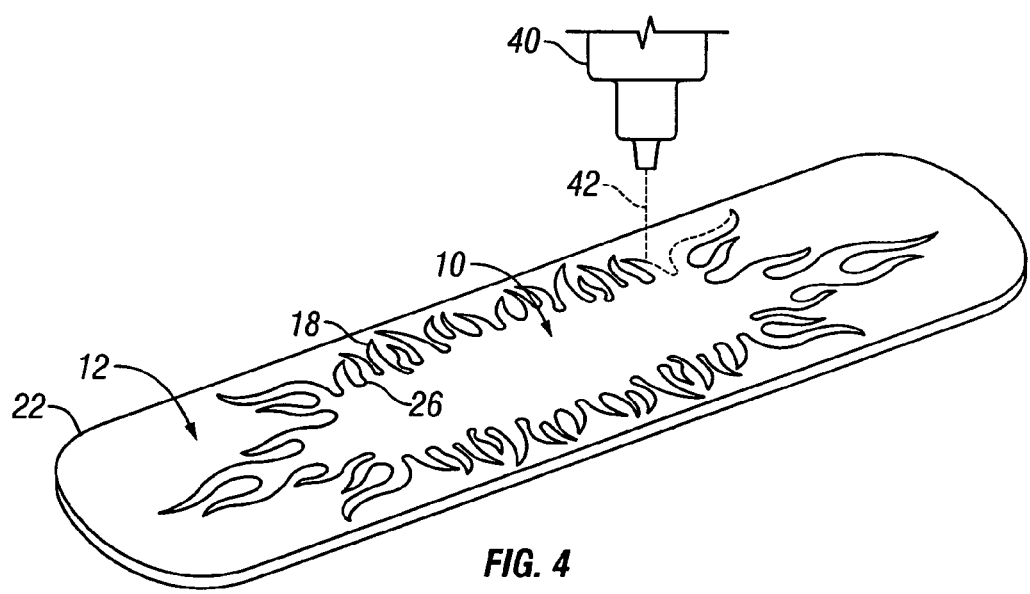
FIG. 4 is a perspective view showing the method for cutting the interior and exterior grilles.

FIG. 4 illustrates the manner in which the interior and exterior grilles are formed. A laser cutter 40 is shown being used with a laser beam 42 that does the cutting. However other methods of cutting maybe used without detracting from the invention. As can be seen in FIG. 4, the exterior grille 12 is formed into a blank having the exterior perimeter 22. Then the laser cutter 40 is used to cut out a pattern followed by the interior perimeter opening of the exterior grille 12. This pattern also forms the outer perimeter 18 of the interior grille insert 10. FIG. 5 shows the completed interior grille 10 and FIG. 6 shows the completed exterior grille 12. As can be seen in FIGS. 5 and 6 the exterior perimeter 18 of interior grille insert 10 matches the exterior perimeter 26 of grille opening 24 in exterior grille insert 12.

Thus there is little or no scrap formed as the result of forming the interior and exterior grilles 10, 12. The shapes of the interior and exterior grilles 12 maybe varied to any variety of desired shapes or forms. Similarly the interior grille 10 can be formed with an interior opening 20 that conforms to any desired logo or identification that appears on the vehicle grille. Thus it can be seen that the device accomplishes at least all of its substated objects.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for making first and second grille inserts for attachment over first grille of a first vehicle and a second grille of a second vehicle respectively, the first and second vehicle grilles each having first and second vehicle grille perimeter edges, respectively, the method comprising:

taking a blank of sheet metal having a first perimeter edge extending there around;

cutting an opening in the blank of sheet material, the opening following a predetermined pattern, so as to form a first grille insert having the first perimeter edge and having an opening therein that is shaped in the predetermined pattern, and a second grille insert having a second perimeter edge shaped and sized in the predetermined pattern;

attaching the first grille insert to the first vehicle grille;

attaching the second grille insert to the second vehicle grille, the second grille insert being smaller than the second vehicle grille.

2. A method according to claim 1 wherein the first perimeter edge of the first grille insert is approximately the same size and shape as the size and shape of the first vehicle grille and the method comprises registering the first grille insert with the first vehicle grille before attaching the first grille insert to the first vehicle grille.

3. A method according to claim 1 and further comprising cutting at least a second opening the second grille insert.

4. A method according to claim 1 and wherein the step of attaching the second grille insert to the second vehicle grille further comprises positioning the second grill insert over the second vehicle grille so that the second perimeter edge of the second grille insert is spaced inwardly from the second vehicle grille perimeter.

5. A method for making an interior grille insert and an exterior grille insert for a first vehicle having a first grille and a second vehicle having a second grille, the method comprising:

forming a single grille blank having a grille blank perimeter;

forming an opening following a predetermined pattern in the single grille blank so as to separate the single grille blank into an interior grille insert shaped in the predetermined pattern and an exterior grille insert having the opening therein;

attaching the interior grille insert to the first grille; and attaching the exterior grille insert to the second grille.

6. The method according to claim 5 and further comprising the second grille having a predetermined shaped and sized perimeter, the external grille having an external perimeter that is approximately the same size and shape as the predetermined shaped and sized perimeter of the second grille, the method further comprising registering the external perimeter of the external grille insert with the predetermined shaped and sized perimeter of the second grille before attaching the exterior grille insert to the second grille.

7. A method for applying a grille insert to a vehicle having a vehicle grille including an exterior vehicle grille surface, a manufacturer's logo being on the exterior vehicle grille surface, the method comprising:

taking a grille blank made of a plate shaped material;

removing a grille insert smaller than the vehicle grille from the plate shaped material of the grille blank so as to make a grille blank opening in the grille blank;

making a logo opening in the grille insert that is at least as large in size as the manufacturer's logo;

registering the logo opening over the manufacturer's logo on the exterior vehicle grille surface so that the manufacturer's logo is visible through the logo opening;

attaching the grille insert in superimposed relation over the vehicle grille so that the manufacturer's logo appears through the logo opening.

8. The method of claim 7 and further comprising making the logo opening the same size and shape as the size and shape of the perimeter of the manufacturer's logo.

9. The method of claim 7 and further comprising attaching the grille blank with the opening to a second vehicle grille of a second vehicle.

* * * * *